US009262704B1

(12) United States Patent
Metcalfe et al.

(10) Patent No.: US 9,262,704 B1
(45) Date of Patent: Feb. 16, 2016

(54) RENDERING IMAGES TO LOWER BITS PER PIXEL FORMATS USING REDUCED NUMBERS OF REGISTERS

(71) Applicant: Xerox Corporation, Norwalk, CT (US)

(72) Inventors: David Jon Metcalfe, Marion, NY (US); Ryan David Metcalfe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/638,743

(22) Filed: Mar. 4, 2015

(51) Int. Cl.
*H04N 1/60* (2006.01)
*G03F 3/08* (2006.01)
*H04N 1/46* (2006.01)
*G06K 9/00* (2006.01)
*G06K 15/02* (2006.01)

(52) U.S. Cl.
CPC ........ *G06K 15/1876* (2013.01); *G06K 15/1835* (2013.01)

(58) Field of Classification Search
None
See application file for complete search history.

(56) References Cited

U.S. PATENT DOCUMENTS

| | | | | |
|---|---|---|---|---|
| 5,428,804 A * | 6/1995 | Davies | ................ | G06F 9/30134 712/22 |
| 5,437,045 A * | 7/1995 | Davies | ...................... | G06T 3/40 345/505 |
| 5,450,603 A * | 9/1995 | Davies | ................ | G06F 15/8015 700/4 |
| 5,450,604 A * | 9/1995 | Davies | .................... | G06T 3/606 711/100 |
| 5,459,846 A * | 10/1995 | Hyatt | .................. | B60R 16/0373 711/167 |
| 5,519,791 A | 5/1996 | Webb et al. | | |
| 5,553,165 A | 9/1996 | Webb et al. | | |
| 5,651,121 A * | 7/1997 | Davies | ................ | G06F 9/30036 708/490 |
| 5,655,131 A * | 8/1997 | Davies | ................ | G06F 9/30036 710/110 |
| 5,892,851 A | 4/1999 | Nguyen | | |
| 6,307,978 B1 | 10/2001 | Metaxas | | |
| 7,889,393 B2 * | 2/2011 | Yoshizawa | ........... | H04N 1/4097 358/1.9 |
| 7,974,471 B2 * | 7/2011 | Matsuno | ............ | G06K 9/00986 382/180 |
| 9,007,659 B1 * | 4/2015 | Yu | ........................ | H04N 1/4052 358/3.03 |
| 2002/0027670 A1 * | 3/2002 | Takahashi | ............ | H04N 1/4095 358/1.9 |
| 2003/0137695 A1 * | 7/2003 | Nomizu | ..................... | G06T 1/60 358/1.16 |
| 2004/0234135 A1 * | 11/2004 | Nomizu | ............. | G06K 9/00456 382/209 |
| 2004/0239996 A1 * | 12/2004 | Hayashi | ..................... | G06T 1/20 358/3.03 |
| 2004/0263524 A1 * | 12/2004 | Lippincott | ................ | G06T 1/60 345/541 |
| 2006/0139681 A1 * | 6/2006 | Walmsley | ............. | G06F 21/445 358/1.14 |
| 2006/0232821 A1 | 10/2006 | Ranganathan | | |
| 2006/0285168 A1 * | 12/2006 | Horino | ..................... | H04N 1/40 358/3.28 |
| 2015/0229807 A1 * | 8/2015 | Metcalfe | .............. | H04N 1/4053 358/3.03 |

\* cited by examiner

*Primary Examiner* — Madelein Nguyen (74) *Attorney, Agent, or Firm* — Gibb & Riley, LLC (57) ABSTRACT

Methods and systems render higher bit per pixel contone images to lower bit formats using multiple registers of a SIMD processor. The rendering process uses a first register to maintain contone image values of all the pixels being simultaneously processed. A second register maintains a threshold value used during the conversion process. A third register maintains one value for the print ready format pixels (e.g., those having less bits per pixel), and a fourth register maintains the other value (e.g., 0) for the print ready format pixels. Also, a fifth register maintains the conversion error amount for all the pixels being simultaneously processed. Sixth through ninth registers maintain distributed conversion error amounts produced by the diffusing process (for different pixels being simultaneously processed); and a tenth register maintains the pixels in the print-ready format produced by the conversion for all the pixels being simultaneously processed.

20 Claims, 11 Drawing Sheets

| VECTOR REGISTER | VECTOR WIDTH | VECTOR ELEMENTS | DESCRIPTION |
|---|---|---|---|
| vVIDEO (176) | 128-BITS | U8 CAST TO U16 | THE VIDEO VECTOR REGISTER THAT CONTAINS THE EIGHT INPUT 8bpp PIXEL VALUES CAST TO 16-BIT UNSIGNED INTEGERS. |
| vTHRESH (177) | 128-BITS | U16 | THE THRESHOLD VECTOR REGISTER THAT CONTAINS THE EIGHT UNSIGNED 16-BIT UNSIGNED THRESHOLD VALUES NORMALLY SET TO "128". |
| v255 (178) | 128-BITS | U16 | THE VECTOR REGISTER THAT CONTAINS THE EIGHT UNSIGNED 16-BIT "255" VALUES USED TO GENERATE THE ERROR CALCULATIONS. |
| v0 (179) | 128-BITS | U16 | THE VECTOR REGISTER THAT CONTAINS THE EIGHT UNSIGNED 16-BIT "0" VALUES USED TO GENERATE THE ERROR CALCULATIONS. |
| vE (175) | 128-BITS | S16 | THE VECTOR REGISTER THAT CONTAINS THE EIGHT SIGNED 16-BIT ERROR VALUES THAT WILL BE DELIVERED TO THE FILTER VECTOR ARRAY FOR ERROR DISTRIBUTION TO THE DOWNSTREAM PIXELS. |
| vEN TO vEN-3 (171-174) | 128-BITS | S16 | THE FOUR VECTOR REGISTERS THAT ARE USED TO APPLY THE PROPER ERROR FILTERING VIA SIMPLE INTER-ELEMENT SHIFTS AND ADDITIONS. |
| vOUT (170) | 128-BITS | U16 | THE RESULTING EIGHT 1bpp RENDERED OUTPUT BINARY PIXELS THAT WILL (EVENTUALLY) BE PACKED AND STORED IN OUTPUT MEMORY. |

RENDERING IMAGES TO LOWER BITS PER PIXEL FORMATS USING REDUCED NUMBERS OF REGISTERS

BACKGROUND

Systems and methods herein generally relate to processing images and more particularly to rendering images to lower bits per pixel formats using reduced numbers of registers.

In systems that convert higher-bit size image data to reduced-bit size image data (so as to allow the image data to be more easily processed) a higher-bit pixel is compared to a threshold value (or threshold values) and, depending upon the relationship of the value of the higher-bit pixel, a reduced bit size data value is generated. For example, if the possible pixel value of the higher-bit image data has a value between 0 and 255, the threshold value may be 128. A pixel value of the higher-bit image data that is equal to or greater than 128 would generate a binary value of 1 (representing a gray scale value of 255) and a pixel value of the higher-bit image data that is equal to or less than 128 would generate a binary value of 0 (representing a gray scale value of 0). In each instance, there would be a difference between the original higher-bit pixel and the converted value, and this difference is referred to as the "error" of the conversion process.

In a conversion process that utilizes error diffusion, this error can be diffused (scattered or propagated) to neighboring pixels. In some systems, the error may be conventionally propagated to the next pixel in the scanline and to adjacent pixels in the next scanline. Moreover, in error diffusion processes, the error is weighted such that an adjacent pixel does not necessarily receive all the error, but only a portion thereof.

Such error diffusion is used in many of today's digital imaging products to render higher-bit contone images to a print-ready lower-bit format. The wide acceptance of error diffusion is mainly due to the inherent rendering properties, which provide favorable print image quality without generating artifacts (i.e. moire', etc.). Moreover, error diffusion provides a good compromise when processing documents with "mixed" content, since it faithfully preserves the image density of photographs, while at the same time rendering text, line-art, and graphics with acceptable print quality.

One drawback of error diffusion, however, is the computational cost of processing images for high-speed applications due to the serial nature of the algorithm. The error diffusion processing node is usually the system-level bottleneck. This is especially true in a software image-path (SWIP) environment (as opposed to the traditional hardware-based FPGA/ASIC devices), where developing high-speed (software-based) image-processing nodes is used to providing a flexible and viable solution.

Various multi-threaded and data parallel techniques accelerate the overall processing speed of images processed via error diffusion. For example, images can be partitioned and sequentially processed via error diffusion one raster or scanline at a time using several concurrent threads in a time-multiplexed fashion, but this requires careful scheduling of the start of each raster relative to the other, to eliminate inter-scanline boundary artifacts. Likewise, other techniques attempt to apply data parallelism on a "tile-to-tile" or "inter-raster" basis in order to improve the overall throughput rate, but these solutions tend to produce low-frequency image artifacts around the periphery of the segmented borders due to the inability to properly distribute the error from one image segment to the next.

SUMMARY

Exemplary methods herein receive, into a single-instruction, multiple-data (SIMD) processor, a contone image having a relatively higher number of bits per pixel (e.g., 8 bits per pixel). These methods use the SIMD processor to convert (or "render") the contone image to a print-ready format. The print ready format has a lower number of bits per pixel relative to the contone image (e.g., one bit per pixel). These methods combine pixels in the print-ready format produced by the conversion into a print-ready image, and output the print-ready image.

More specifically, when performing the rendering, these methods sequentially render pixels of the contone image along scanlines of the contone image. The scanlines are straight lines of pixels of the contone image that are aligned in a certain direction (sometimes referred to as the "processing direction") and such scanlines are parallel to one another. In other words, the scanlines are adjacent pixels forming a straight line in the processing direction (in a two-dimensional array of pixels forming the contone image).

The rendering produces a conversion error amount for each pixel rendered. This conversion error amount can be based on the difference between the value of the contone image pixel and a threshold value. These methods diffuse (or "allocate") a portion of the conversion error amount from a pixel in a scanline to at least one other pixel in the same scanline and to one or more pixels in an immediately adjacent scanline or scanlines (and in some situations, the conversion error is only diffused to the current scanline and one adjacent scanline). Therefore, the error diffusion provides different portions of the conversion error amount to different pixels.

These methods simultaneously render pixels in immediately adjacent scanlines, but do so in a spaced manner that separates pixels being simultaneously processed by a pixel distance (e.g., four-pixel distance) in the processing direction. This pixel distance in the processing direction allows time for the conversion error amount to be supplied to the pixels being simultaneously processed, so that the conversion error from other pixels can be received before simultaneous processing begins on the pixels being simultaneously processed. In other words, this pixel distance is parallel to the processing direction and is a distance measured in pixels aligned in the processing direction, and prevents rendering pixels until all conversion error is received from all other pixels from which conversion error can be received.

The rendering processes uses multiple registers of the SIMD processor. More specifically, the rendering process uses a first register of the SIMD processor to maintain contone image values (e.g., those having more bits per pixel) of all the pixels being simultaneously processed. A second register of the SIMD processor is used to maintain a threshold value used during the rendering process. A third register of the SIMD processor is used to maintain one value (e.g., 255) for the print ready format pixels (e.g., those having less bits per pixel), and a fourth register of the SIMD processor is used to maintain the other value (e.g., 0) for the print ready format pixels. Also, a fifth register of the SIMD processor is used to maintain the conversion error amount for all the pixels being simultaneously processed. Sixth through ninth registers of the SIMD processor maintain distributed conversion error amounts produced by the diffusing process (for different pixels being simultaneously processed); and a tenth register of the SIMD processor is used to maintain the pixels in the print-ready format produced by the rendering for all the pixels being simultaneously processed. Therefore, such processing only requires one scanline of memory to store the error values, while simultaneously processing a swath of 8 scanlines.

These and other features are described in, or are apparent from the following detailed description:

BRIEF DESCRIPTION OF THE DRAWINGS

Various exemplary systems and methods are described in detail below, with reference to the attached drawing figures, in which.

DETAILED DESCRIPTION

As mentioned above, one drawback of error diffusion is the computational cost of processing images. For example, some multi-threaded rendering techniques utilize separate registers (e.g., registers are generally separate electronic storage and calculation areas used by a processor) for each rendering data element (higher pixel value, threshold value, upper and lower binary values, error values, etc.) of each pixel being simultaneously processed. Therefore, each pixel being simultaneously processed will utilize many registers, such as a separate register for the higher-pixel value, a separate register for the threshold value, a separate register for the upper binary number, a separate register for the lower binary number, a separate register for the error value, separate registers for each diffused error value, etc. In multi-thread processing these registers are not shared by the processing of other pixels. This processing consumes a large amount of the available register resources. Therefore, for example, if a multi-thread rendering process has 10 data elements and 8 pixels are being simultaneously rendered, up to 80 registers could be consumed by the multi-thread parallel rendering process.

Therefore, the systems and methods herein utilize less of the available registers in single-instruction, multiple-data (SIMD) processors for pixels being simultaneously rendered in parallel by using a single-thread technique. More specifically, with the system and methods herein, each register maintains a different data-rendering element from many pixels being rendered simultaneously, to reduce the number of registers needed to process the same number of pixels simultaneously. In other words, the systems and methods herein use a single register for higher-pixel value of all pixels being rendered in parallel, a single register for the threshold value, a single register for the upper binary number, a single register for the lower binary number, a single register for the error value of all pixels being rendered in parallel, single registers for each diffused error value of all pixels being rendered in parallel, etc. Thus, with the systems and methods herein a rendering process that has 10 data elements rendering 8 pixels in parallel only uses 10 registers because of the single-thread parallel rendering process described herein. This improves the performance of the processor by speeding operations and decreasing the number of registers that are consumed by the processing, thereby freeing registers for other processing activities. As noted below, this single-thread process can also be multi-threaded for additional processing gains.

The systems and methods herein fully utilize the latest capabilities of the SIMD intrinsics that are available on today's advanced multi-core processors. Moreover, the systems and methods herein use "anti-worm" error diffusion filter coefficients to take advantage of an opportunity to leverage this detail as a mechanism to exploit SIMD intrinsics, with a much higher efficiency than was previously envisioned. In addition, the systems and methods herein can be tuned for both color as well as monochrome image-processing applications to achieve optimal acceleration factors. Lastly, the systems and methods herein are scalable to take advantage of future extensions of the vector register widths (i.e. 128→256→512) in order to exploit the impending architecture enhancements that are already being planned for future multi-core processors.

With respect to multithreaded versus data parallel acceleration, as previously mentioned, the inherent sequential nature of error diffusion imposes output speed limitations due to the need to process one pixel at a time for proper, defect-free rendering. Various multi-threaded techniques have previously been developed in an attempt to accelerate the overall processing speed of images rendered via error diffusion. However, many of these techniques require complex routines to properly schedule the threads for each raster or tile to avoid boundary artifacts. In addition, the multi-threaded approaches assume that an unlimited number of threads can be accessed at a time (which actually results in minimal acceleration when error diffusion is incorporated within a copy-path consisting of multiple image-processing nodes). In other words, relying on multi-threading to simply accelerate the processing of the CMYK & Mono error diffusion software nodes does not necessarily imply that the overall copy-path processing throughput rate will improve, since these threads are also needed to concurrently process the image-tiles for the other software nodes contained within the image path. One can visualize this as a fixed amount of cores competing with one another to process image-tiles for each of the image processing units depicted in FIGS. 1A and 1B. In the case where the number of processing units exceeds the number of processor cores, utilizing data parallelism therefore is much more beneficial with respect to accelerating the copy path's overall video throughput rate.

Figure 1A:
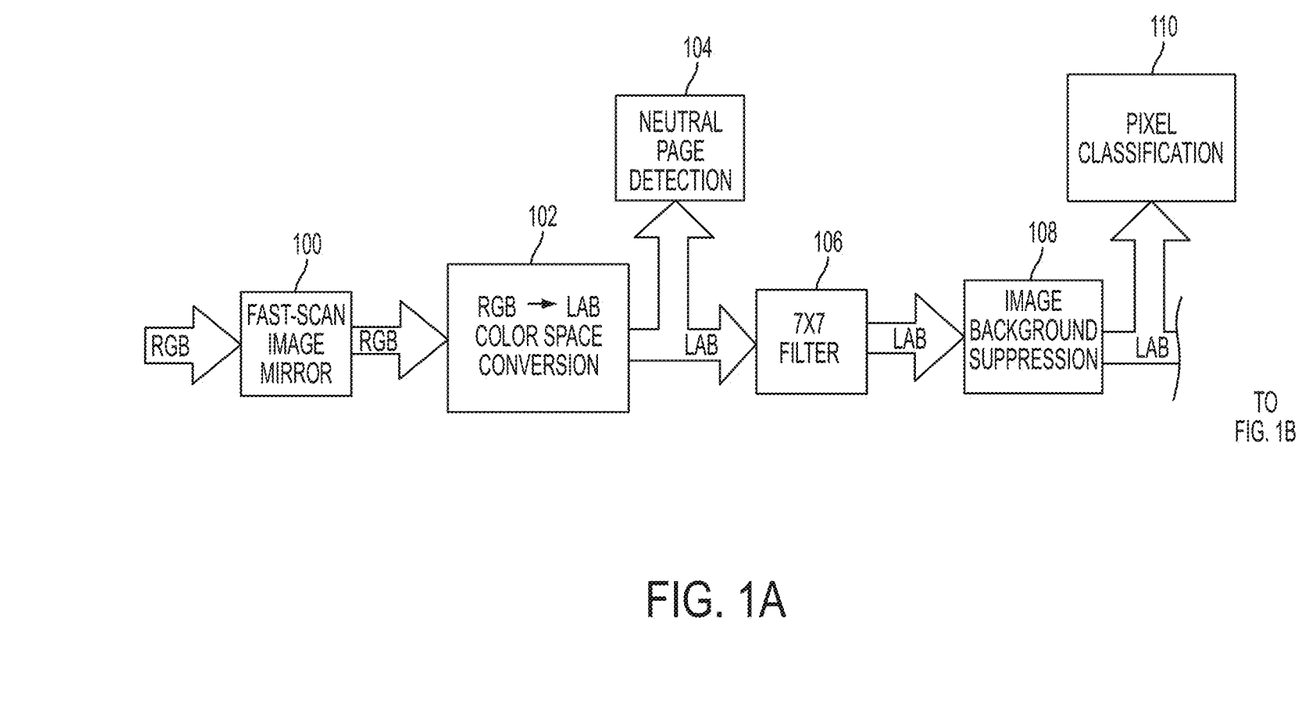
FIGS. 1A and 1B are schematic diagrams illustrating auto-color image processing nodes contained within an imaging path used by systems and methods herein.
Figure 1B:
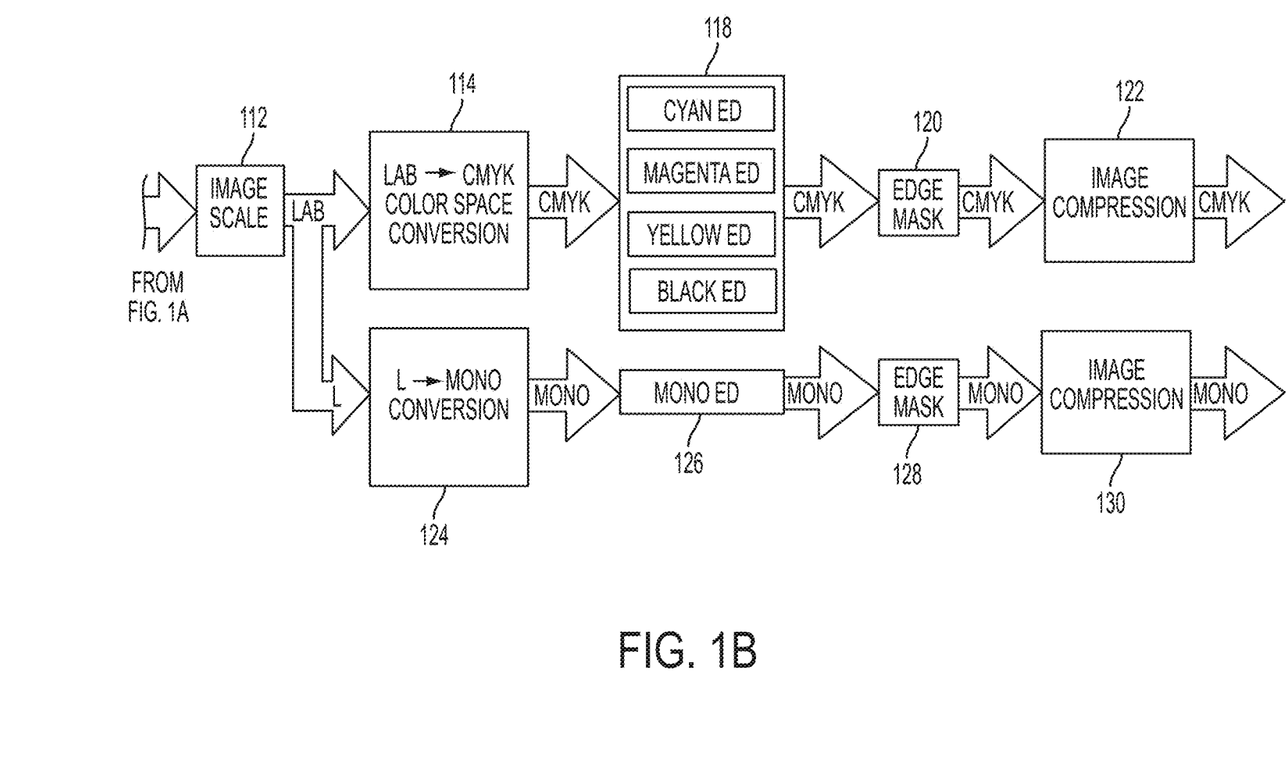

More specifically, FIGS. 1A and 1B illustrate auto-color image processing nodes contained within an imaging path, such as a fast-scan image mirror 100, RGB-Lab color space conversion 102, neutral page detection 104, various filtering 106, image background suppression 108, pixel classification 110, image scaling 112, Lab-CMYK (cyan, magenta yellow, black) color space conversion 114 and corresponding Lab-mono conversion 124, CMYK error diffusion 118 and mono error diffusion 126, edge masks 120, 128, and image compression 122, 130.

Figure 2:
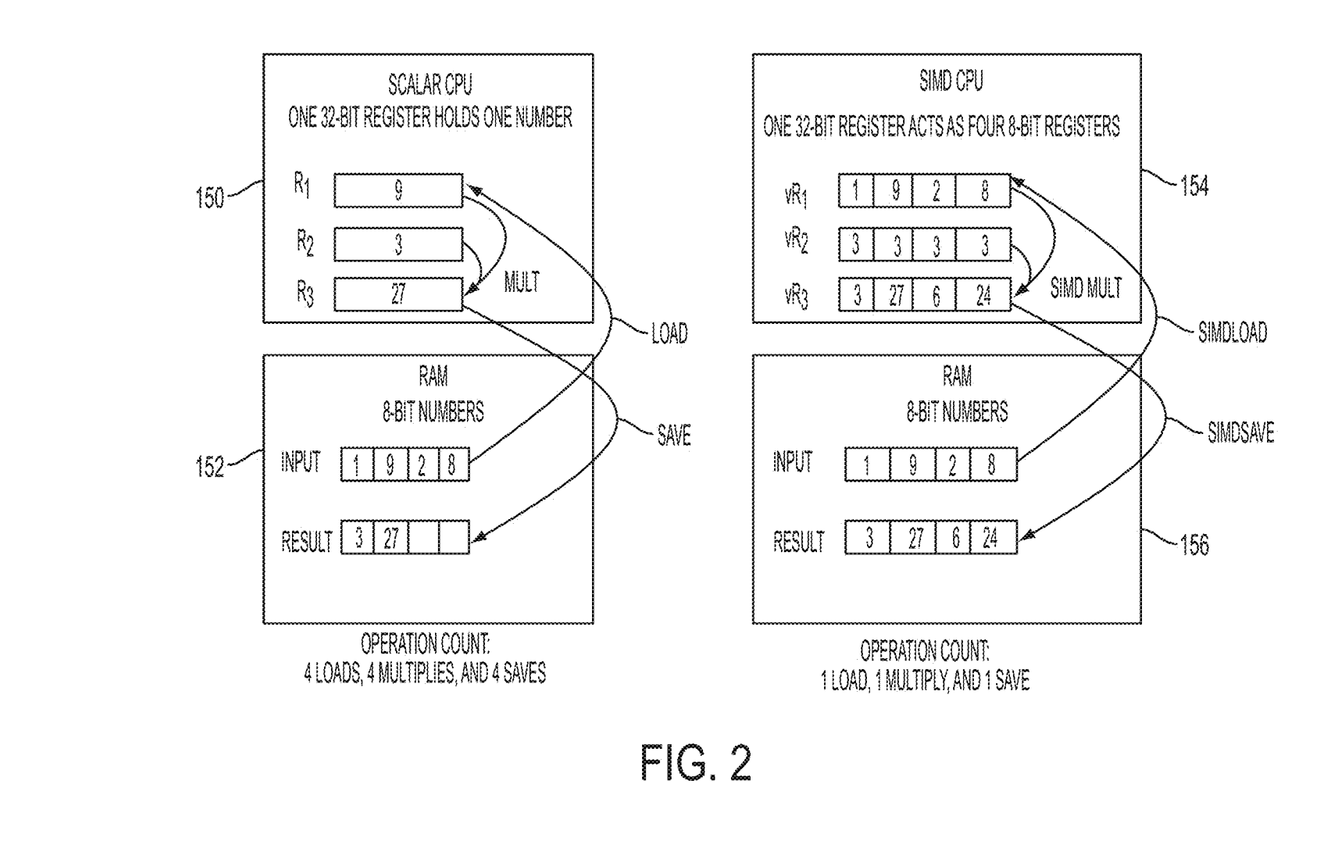
FIG. 2 is a schematic diagram illustrating the processing of several pixels at a time by systems and methods herein.

With respect to scalar versus SIMD instructions, SIMD instructions accelerate the video throughput rate by processing multiple amounts of data in parallel as opposed to loading and processing one operation (pixel) at a time. These vector operations take place within dedicated "vector" registers. The ability to apply the same arithmetic operations in parallel is a useful mechanism for data parallel acceleration. FIG. 2 is a simplified diagram that illustrates the processing of several pixels at a time between the vectorized (SIMD) approach as opposed to its scalar counterpart.

More specifically, as shown by the actions between RAM (random access memory) 152 and the scalar CPU (central processing unit) 150, each register (R1-R3) requires four loading operations, four multiplication operations, and four save operations to process four pixels. To the contrary with the SIMD CPU 154 when working with RAM 156, because the registers maintain data related to multiple pixels (where a 32-bit register acts as four 8-bit registers) a single load operation, a single multiply operation and a single save operation are only performed. Thus, as shown in FIG. 2, the ability to process four pixels via the SIMD operations is four times faster and uses one-quarter of the processing resources relative to scalar processing. With increases in vector register widths in the future generations of processors (128-bits→256-bits), the acceleration scales accordingly.

As noted above, vectorizing the error diffusion rendering operation is problematic due to the sequential nature of the algorithm. For example, the rendered pixel following the current one depends on whether or not the current pixel is binarized to a "0" or "1." In other words, these are not "point process" operations that can concurrently work on small image segments without generating border artifacts.

However, multiple scanlines can indeed be processed via error diffusion if the current scanline's pixel is processed behind (e.g., at least 4 pixels behind) the previous scanline's pixel. This allows a "multi-threaded" error diffusion approach to offer acceleration by properly "starting" each thread to work on the subsequent scanline(s) at the appropriate time(s). This results in an image being processed in a trapezoidal "wave-front" fashion while maintaining a faithful 1 bpp rendered error-diffused output w/o border artifacts.

Figure 3:
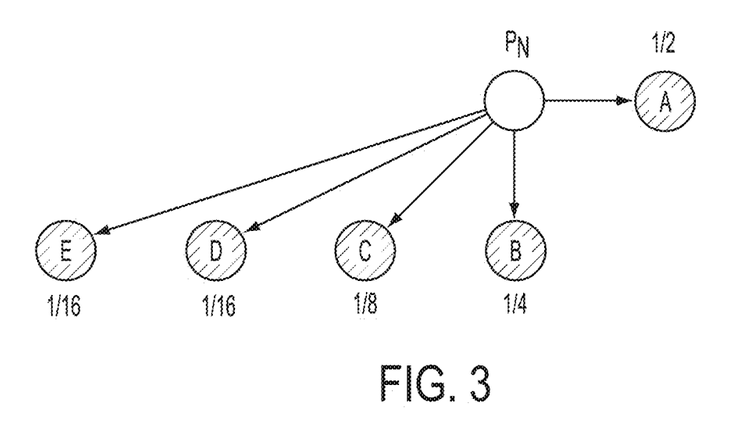
FIG. 3 is a schematic diagram illustrating one exemplary error diffusion process used by systems and methods herein.

One exemplary error diffusion process is shown in FIG. 3. In FIG. 3 pixel $P_N$ is the pixel being currently process, pixel A is the pixel that will be processed next, and pixels B-E are pixels on an adjacent scanline. As noted above, during rendering some error will be generated and one-half of this error is allocated to pixel A; one-quarter of this error is allocated to pixel B; one-eight of this error is allocated to pixel C; and 1/16 of this error is allocated to pixels D and E. With systems and methods herein, pixels A-E are not rendered in parallel with pixel $P_N$ because pixels A-E must receive diffused error from pixel $P_N$ before rendering; however, pixels other than A-E can be rendered with pixel $P_N$, by processing multiple scanlines at a time, while at the same time leveraging the SIMD intrinsics to achieve optimal acceleration, as discussed below.

Figure 4:
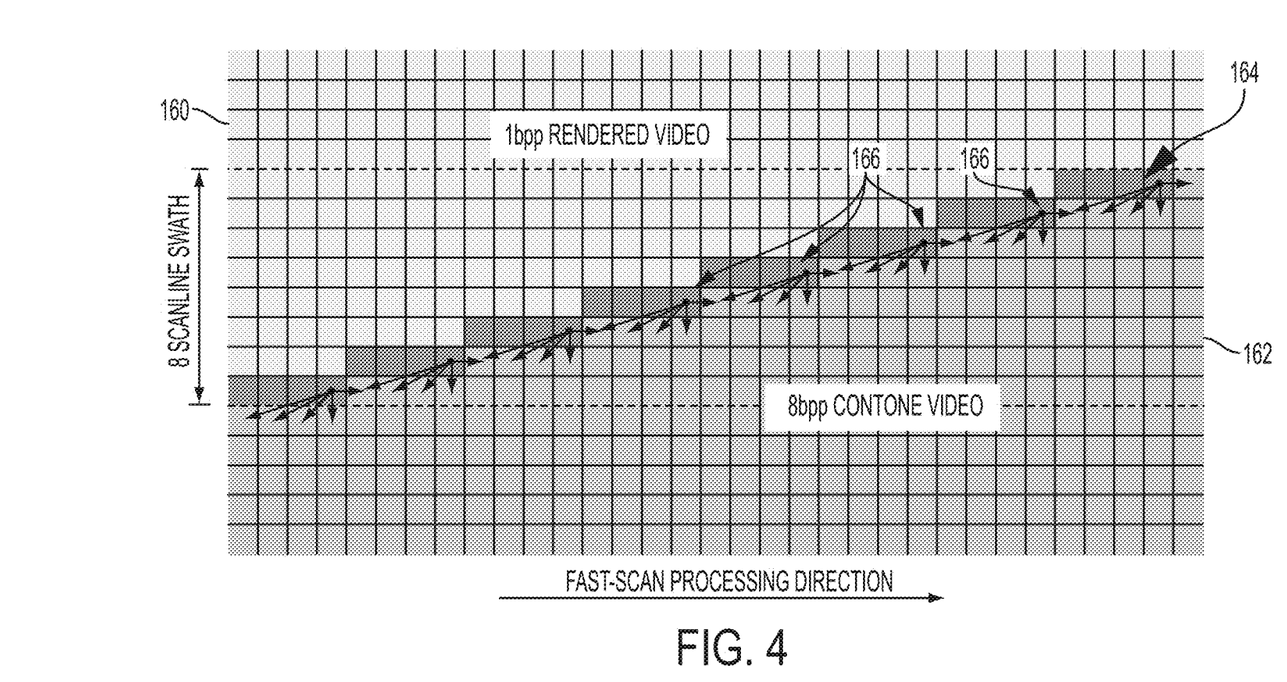
FIG. 4 is a schematic diagram illustrating error diffusion, using the process illustrated in FIG. 3, used by systems and methods herein.

To better understand how the parallel error diffusion can be applied, an x/y coordinate pixel (image) matrix is presented in FIG. 4, and error diffusion using the process illustrated in FIG. 3 is performed in FIG. 4. More specifically, in FIG. 4 an 8-scanline tile "swath" that renders the eight bits per pixel (8 pbb) contone video 162 to the one bit per pixel (1 pbb) rendered video 160 in the fast-scan processing direction is presented to provide an example of processing (filtering the error component(s)) using 128-bit vector registers. Those skilled in the art would understand that this processing can be applied to any size bit per pixel using any sized registers and 8 bpp, 1 bpp, 128-bit vectors, etc., are only used as examples to conceptually illustrate the features of systems and methods herein. Further, while one error diffusion method is shown here, those skilled in the art would understand that all other error diffusion methods (whether currently known or developed in the future) are useful with the systems and methods herein.

In the example shown in FIG. 4, the pixels 166 with dots in the centers are all rendered in parallel (simultaneously). Note that each of the simultaneously rendered pixels 166 are a four-pixel distance away from one another (in the processing direction) in order to allow error to be fully propagated to all pixels before a pixel is rendered. Other pixel distances (other than 4 pixels) could be similarly used with systems and methods herein. The areas 164 in FIG. 4 represent the regions where the error component (derived from the previous scanlines) are filtered and diffused to the downstream pixels on the subsequent scanlines.

Further, with systems and methods herein, a reduced number of registers is utilized by maintaining data of many pixels be simultaneously processed in each register. In the example shown in FIG. 4, 128-bit registers can each be cast to eight concatenated 16-bit signed integer values. In this example, 16-bits provide sufficient resolution to filter and diffuse/distribute the error component from one pixel to the others.

Figure 5:
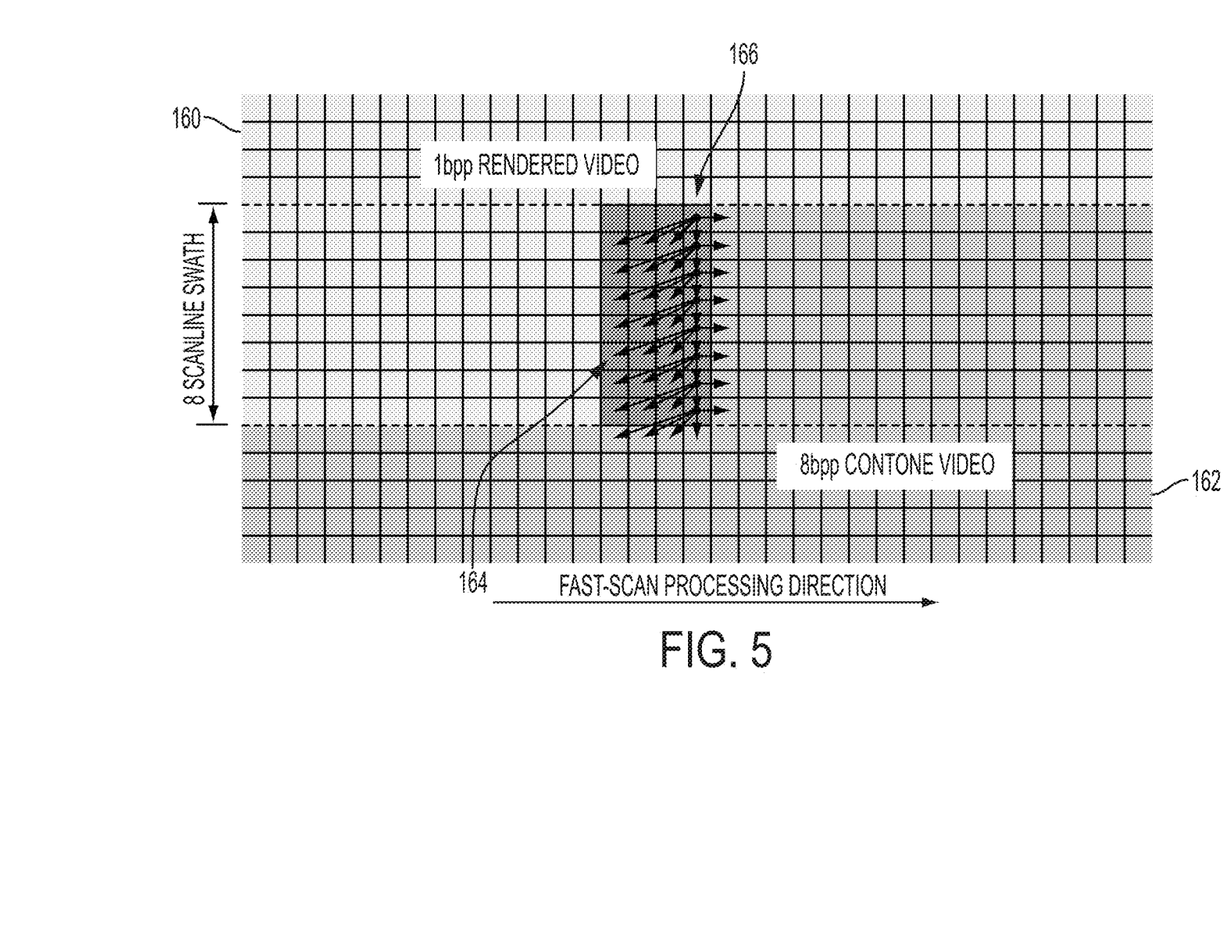
FIG. 5 is a schematic diagram illustrating shifting the x/y coordinate matrix image so that the actual pixels being processed in parallel are aligned, according to systems and methods herein.

The processing can also be visualized by shifting the x/y coordinate matrix image so that the actual pixels being processed in parallel 166 are aligned in the horizontal (fast-scan) direction, and this is shown in FIG. 5. FIG. 5 is for illustration purposes only in order to conceptualize how the error can be combined and processed within local vector registers to accomplish the error filtering operation using less registers. The pixels that are actively being processed in parallel 166 from one scanline to the next are indeed staggered by the four-pixel distance, as depicted in FIG. 4 above.

As shown in FIG. 5, the error generated from binarizing each one of the eight pixels 166 can be grouped into four 128-bit vector registers (shown by shaded areas 164) with each vector register cast to hold eight, 16-bit concatenated signed integer values. In other words, in this example the error filter uses a 4×8 array of 16-bit signed values using only four 128-bit vector registers.

Figure 6:
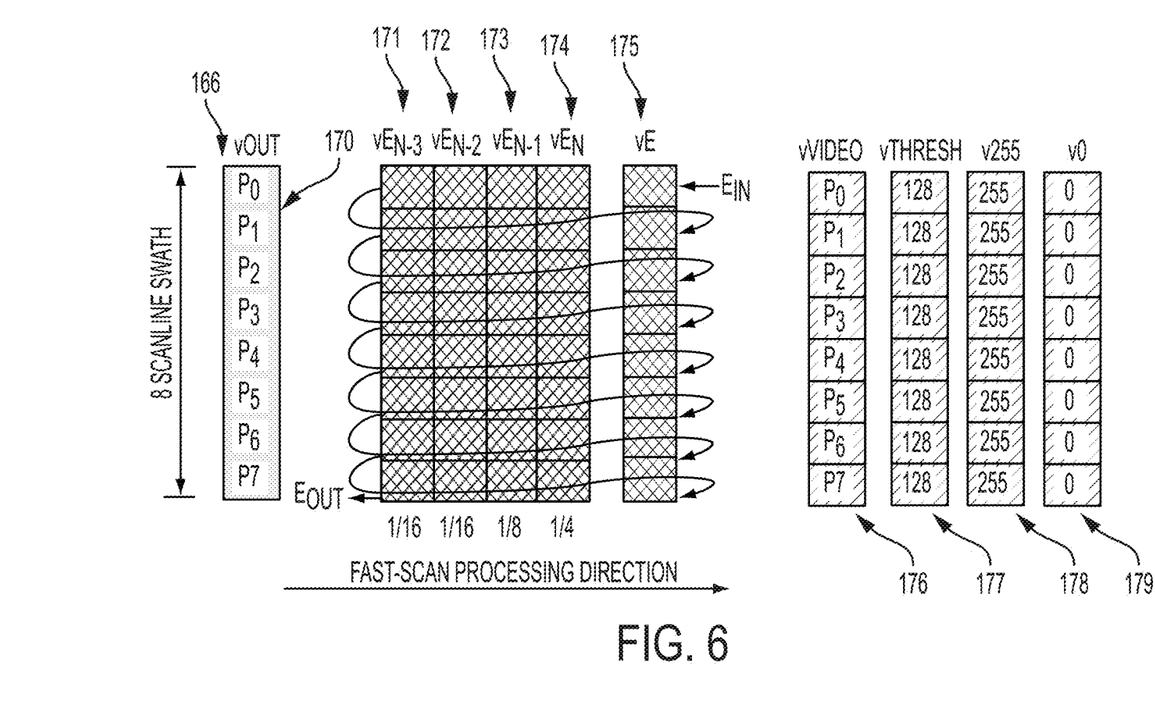
FIG. 6 is a schematic diagram illustrating vector registers used to process the pixels by systems and methods herein.
Figure 7:
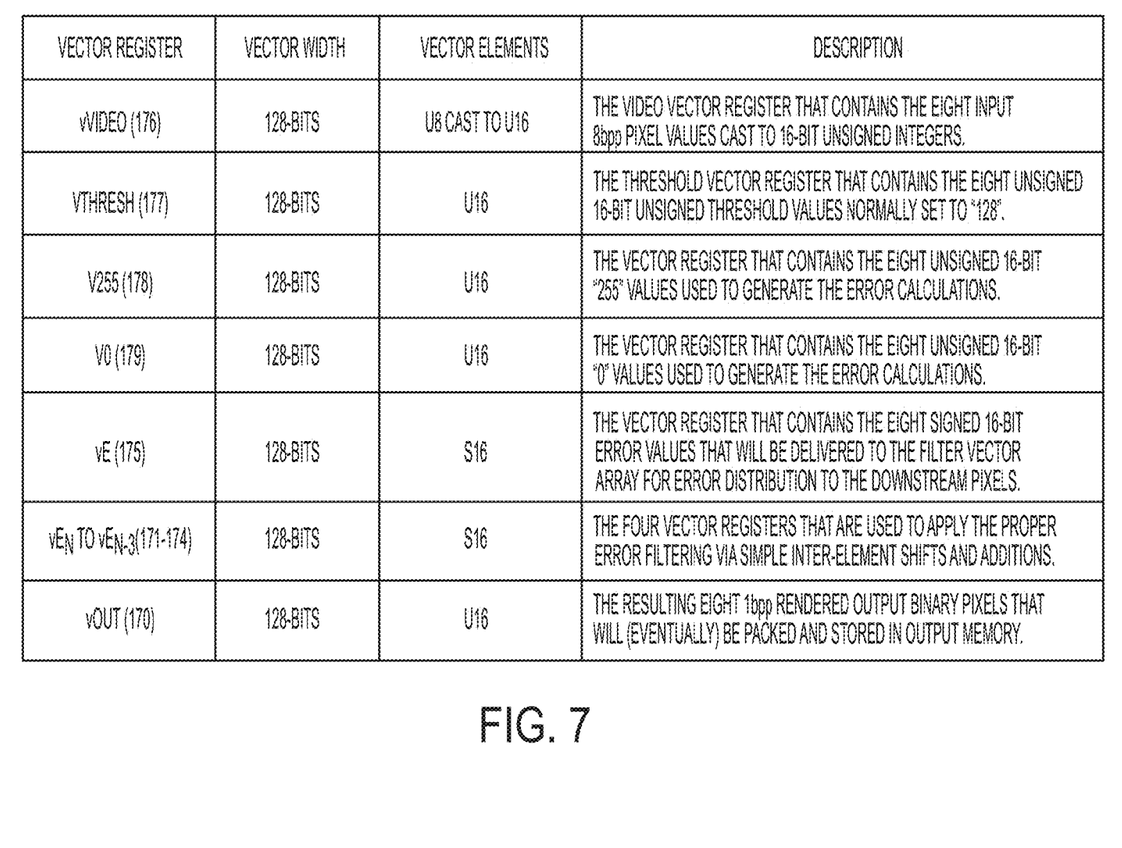
FIG. 7 is a table providing a description of the different registers used by systems and methods herein.

Consistent with the concept shown in FIG. 5, FIG. 6 depicts the vector registers used to simultaneously process the eight pixels 166 shown in FIGS. 5 and 6 via SIMD operations. Additionally, the table in FIG. 7 provides a description of the different registers (170-179) shown in FIG. 6, and specifies vector width and vector elements used in the example being presented.

The higher-bit pixel values of all pixels 166 that are to be simultaneously rendered to a lower-bit value are input to a first register 176. In this example, register 166 contains the eight input 8 bpp pixel values cast to 16-bit unsigned integers. The error that is generated from the thresholding operation is shifted from right-to-left and into the error filter array ($_vE_N$ to $_vE_N-3$) that uses 4 registers, identified using identification numerals 171-174. In this example, register 175 contains the eight signed 16-bit error values that will be delivered to the filter vector array (171-174) for error distribution to the downstream pixels. Further, in this example registers 171-174 are the four vector registers that are used to apply the proper error filtering via simple inter-element shifts and additions.

Additional registers are used to maintain the rendered pixel values 170, the threshold values used in the rendering process 177, the high binary value 178, and the low binary value 179. In this example, register 177 contains the eight unsigned 16-bit unsigned threshold values set in this example to "128"; register 178 contains the eight unsigned 16-bit "255" values used to generate the error calculations; register 179 contains the eight unsigned 16-bit "0" values used to generate the error calculation; and register 170 contains the resulting eight 1 bpp rendered output binary pixels that will (eventually) be packed and stored in output memory.

Therefore, in this example of reducing 8-bit pixels to 1-bit pixels, 10 vector registers (170-179) are used to apply the necessary error diffusion calculations, including: thresholding; video compare; error generation; and error filtering, distribution, and diffusion. To the contrary, as noted above, multi-tread processing could use up to 80 registers for the same operation. Those skilled in the art would understand that any type of rendering could be used with the systems and methods herein and that the foregoing example is used to illustrate the features herein, but that this example does not limit the applicability of the systems and methods herein to other rendering operations.

Continuing with this example, in order to generate the 1 bpp video output and error components via SIMD vectorization, the following calculations can be performed:

vVideo+=vE;
vOut=(vVideo>vThresh) ? v255: v0;
vE=vVideo−vOut;
vOut=vOut & 0x01;

One feature of anti-worm coefficients is the simplicity in which the downstream error is calculated. This reduces to a series of vector right-shifts and additions within each of the four error filter vector registers as follows:

$vE_N$=vE>>2;
$vE_{N-1}$+=(vE>>3);
$vE_{N-2}$+=(vE>>4);
$vE_{N-3}$+=(vE>>4);

The error used as input for the subsequent scanline is derived from the last vector register contained within the error filter array:

vE=$vE_{N-3}$;

The error to be stored in the error buffer memory (i.e. the 16-bit scalar value needed for processing the next "swath" of input video) is derived from the last scalar element of $vE_{N-3}$.

Eout=vE[7]$_{N-3}$;

In order to prepare for processing the next set of eight pixels, the vector register containing the error components is shifted by one element (i.e. inter-element shift by one 16-bit element) as follows:

1. vE[7]=vE[6];
2. vE[6]=vE[5];
3. vE[5]=vE[4];
4. vE[4]=vE[3];
5. vE[3]=vE[2];
6. vE[2]=vE[1];
7. vE[1]=vE[0];

Lastly, the lowest 16-bit scalar element contained within the vector error register is updated with the 16-bit error value that was stored within memory as follows:

vE[0]=Ein;

The video vector register is now updated with the next set of eight 8 bpp input pixels, and the same step-by-step processing operations (as described above) will generate the next set of eight 1 bpp output pixels.

Figure 8:
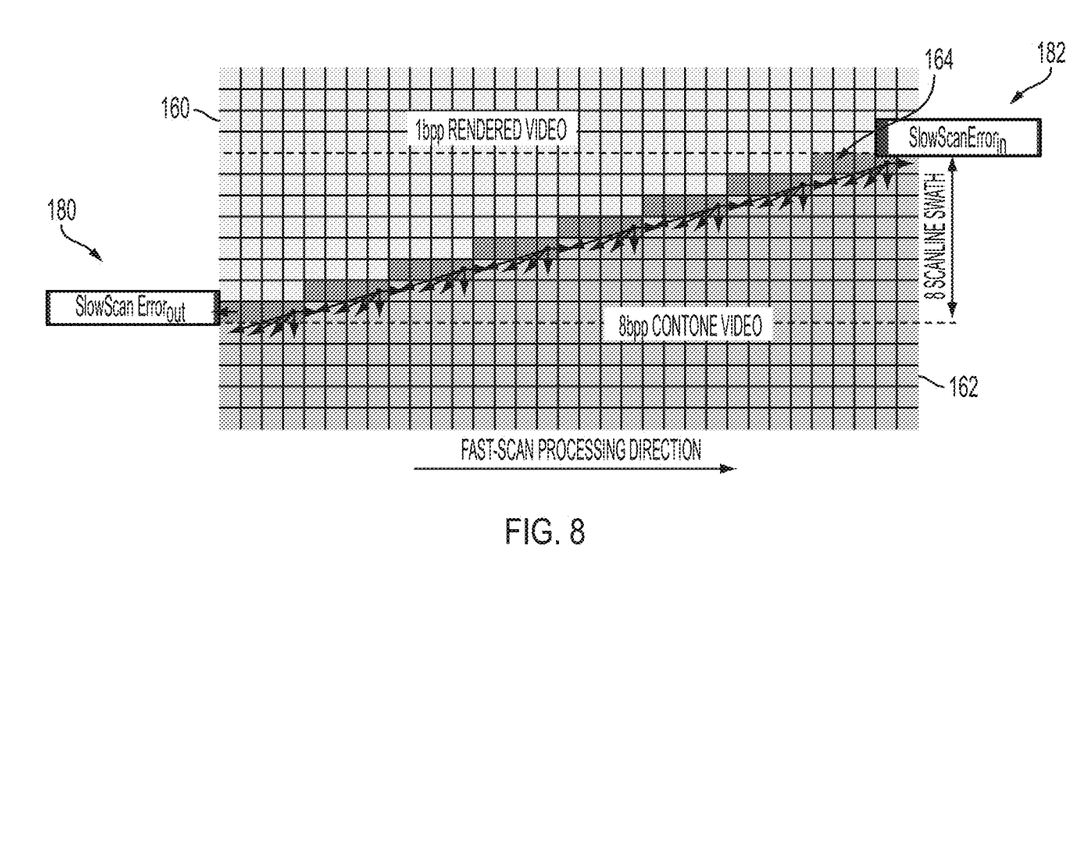
FIG. 8 is a schematic diagram illustrating the use of information contained within the error buffer by systems and methods herein.

Therefore, as shown above, with systems and methods herein only one scanline swath of error is stored and maintained, even though eight rasters are concurrently being processed at a time. In other words, the amount of memory to simultaneously render a swath of eight scanlines is the same as the traditional singular raster error diffusion approach. The reason for this is because of the ability of the internal SIMD 4×8 vector register array to store and properly filter the error generated from the uppermost 1st raster and accurately propagate this to the lowermost 8th raster pixel. The information contained within the error buffer (SlowScanErrorout 180) is then accessed and used as input to process the subsequent eight-scanline swath of input video (SlowScanErrorin 182), as shown in FIG. 8.

Similar to the multi-threaded error-diffusion techniques contained discussed previously, the systems and methods herein can also be multi-threaded in order to further increase the video throughput rate. In this case, each thread would work on a swath of 8-scanlines and would need to be scheduled at the right time(s) such that the previous swath is started at least 28 pixels ahead of the current swath (using the requirements of the example set forth above). As more cores are added to processors in the future, incorporating the multi-threaded capability to the systems and methods herein can improve the overall throughput rate, especially if the number of cores reaches or exceeds the number of image-processing nodes contained within the image path. The systems and methods herein can easily take advantage of future vector register extensions in order to offer higher video throughput rates.

Therefore, the systems and methods herein can be used to render each color plane within an auto-color image copy graph, where an error diffusion node is instantiated (for example, five times in order to handle the CMYK and Mono video planes). The systems and methods herein are also scalable to take advantage of future extensions of the vector register widths (i.e. 128→256→512) and also can be multi-threaded in order to exploit the impending architecture enhancements that are anticipated for the next generation of multi-core processors.

Figure 9:
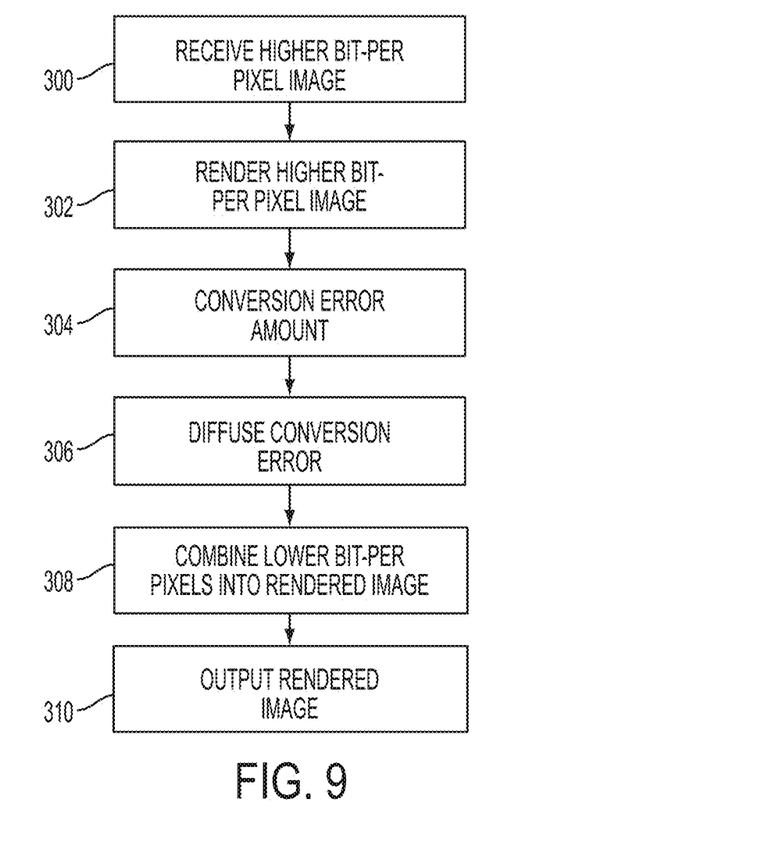
FIG. 9 is a flow diagram of various methods herein.

FIG. 9 is flowchart illustrating exemplary methods herein. In item 300, these methods receive, into a single-instruction, multiple-data (SIMD) processor, a contone image having a relatively higher number of bits per pixel (e.g., eight bits per pixel). In item 302, these methods use the SIMD processor to convert (or "render") the contone image to a print-ready format. The print ready format has a lower number of bits per pixel relative to the contone image (e.g., one bit per pixel).

More specifically, when performing the rendering 302, these methods sequentially render pixels of the contone image along scanlines of the contone image. The scanlines are straight lines of pixels of the contone image that are aligned in a certain direction (sometimes referred to as the "processing direction") and such scanlines are parallel to one another. In other words, the scanlines are adjacent pixels forming a straight line in the processing direction (in a two-dimensional array of pixels forming the contone image).

The rendering 302 produces a conversion error amount 304 for each pixel rendered. This conversion error amount can be based on the difference between the value of the contone image pixel and a threshold value. Therefore, in item 306, these methods diffuse (or "allocate") a portion of the conversion error amount from a pixel in a scanline to at least one other pixel in the same scanline and to one or more pixels in an immediately adjacent scanline or scanlines (in the example set forth above, the conversion error is only diffused to the current scanline and one adjacent scanline). Therefore, the error diffusion 306 provides different portions of the conversion error amount to different pixels.

These methods simultaneously render pixels in immediately adjacent scanlines, but do so in a spaced manner that separates pixels being simultaneously processed by a pixel distance (e.g., four-pixel distance) in the processing direction. This pixel distance in the processing direction allows time for the conversion error amount to be supplied to the pixels being simultaneously processed, so that the conversion error from other pixels can be received before simultaneous processing begins on the pixels being simultaneously processed. In other words, this pixel distance is parallel to the processing direction and is a distance measured in pixels aligned in the processing direction, and prevents rendering pixels until all conversion error is received from other pixels from which conversion error can be received. Therefore, such processing only requires one scanline of memory to store the error values, while simultaneously processing a swath of 8 scanlines.

As shown in item 308, these methods combine lower per-bit pixels in the print-ready format produced by the conversion into a print-ready rendered image, and (in item 310) output the rendered image.

The hardware described herein plays a significant part in permitting the foregoing method to be performed, rather than function solely as a mechanism for permitting a solution to be achieved more quickly, (i.e., through the utilization of a computer for performing calculations). For example, the rendering processes uses multiple registers of the SIMD processor. More specifically, the rendering process uses a first register of the SIMD processor to maintain contone image values (e.g., those having more bits per pixel) of all the pixels being simultaneously processed. A second register of the SIMD processor is used to maintain a threshold value used during the rendering process. A third register of the SIMD processor is used to maintain one value (e.g., 255) for the print ready format pixels (e.g., those having less bits per pixel), and a fourth register of the SIMD processor is used to maintain the other value (e.g., 0) for the print ready format pixels. Also, a fifth register of the SIMD processor is used to maintain the conversion error amount for all the pixels being simultaneously processed. Sixth through ninth registers of the SIMD processor maintain distributed conversion error amounts produced by the diffusing process (for different pixels being simultaneously processed); and a tenth register of the SIMD processor is used to maintain the pixels in the print-ready format produced by the rendering for all the pixels being simultaneously processed.

As would be understood by one ordinarily skilled in the art, the processes described herein cannot be performed by human alone (or one operating with a pen and a pad of paper) and instead such processes can only be performed by a machine. Specifically, processes such as converting pixel values, using registers within SIMD processors, etc., requires the utilization of different specialized machines. Therefore, for example, the rendering performed by the devices herein cannot be performed manually (because it would take decades or lifetimes, if such are even possible) and is integral with the processes performed by methods herein. Further, such machine-only processes are not mere "post-solution activity" because the rendered image is further processed after it is rendered (e.g., by a subsequent printer or display device).

Similarly, the rendering process utilizes special-purpose equipment (digital front ends (DFE's), print servers, etc.) that are distinct technology from a general-purpose processor. Also, the data conversion to different bit sizes is integral with the process performed by the methods herein, and is not mere post-solution activity, because the rendering process uses specific registers of a processor, and cannot be performed without such processor and such registers. In other words, these various machines are integral with the methods herein because the methods cannot be performed without the machines (and cannot be performed by humans alone).

Additionally, the methods herein solve many highly complex technological problems. For example, as mentioned above, conventional error diffusion processes consume large amounts of computing resources (e.g., registers, processor cores, etc). Methods herein solve this technological problem by substantially reducing the number of registers occupied, thereby freeing such registers for other uses which speeds up the operations of the processor. This reduces the amount of electronic storage that a provider must maintain, and also reduces the technological requirement of such storage devices. By reducing the memory load on processors and thereby speeding the operations performed by the processors, the methods herein reduce the amount and complexity of hardware and software needed to be purchased, installed, and maintained, thereby solving a substantial technological problem that is experienced today.

Figure 10:
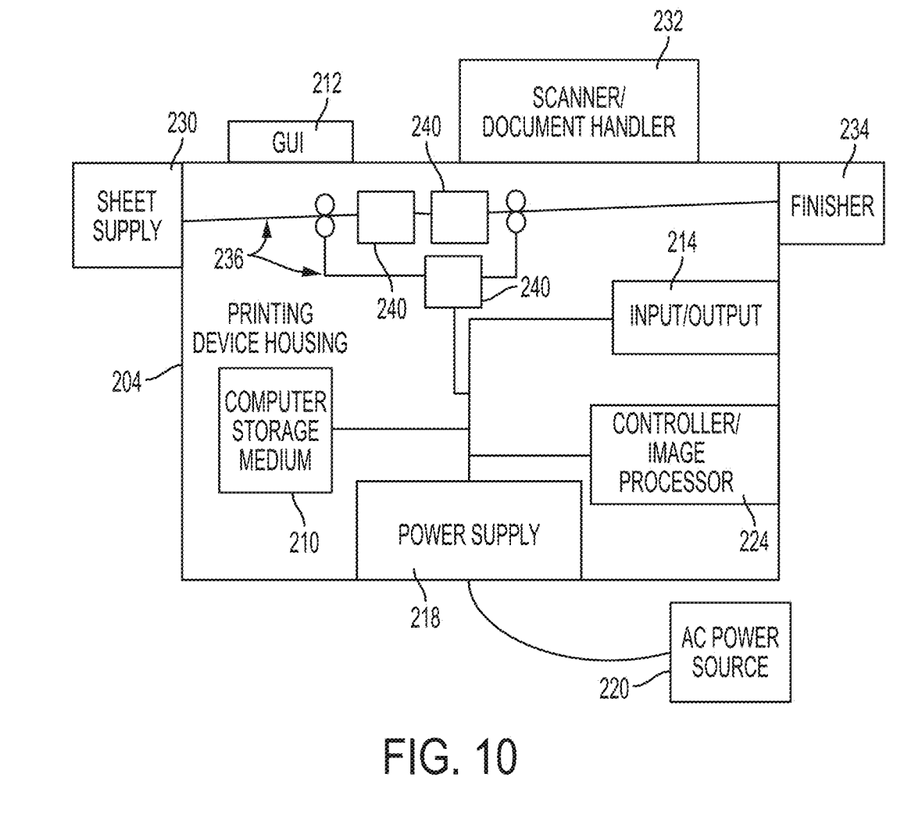
FIG. 10 is a schematic diagram illustrating devices herein.

As shown in FIG. 10, exemplary systems herein include various computerized devices 204, which can be, for example, a print server, a portable computing device, etc. The computerized device 204 includes a controller/tangible processor 224 and a communications port (input/output) 214 operatively connected to the tangible processor 224 and to the computerized network external to the computerized device 204. Also, the computerized device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 204 and comprises a wired device or wireless device (of any form, whether currently known or developed in the future). The tangible processor 224 controls the various actions of the computerized device. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 10, a body housing has one or more functional components that operate on power supplied from an alternating current (AC) source 220 by the power supply 218. The power supply 218 can comprise a common power conversion unit, power storage element (e.g., a battery, etc), etc.

The computerized device 204 can comprise, for example, a printer, copier, multi-function machine, multi-function device (MFD), etc. The printing device 204 includes at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

A raster image processor (RIP) is a component used in a printing system that produces a raster image also known as a bitmap. The bitmap is then sent to a printing device for output. Raster image processing is the process that turns vector digital information into a high-resolution raster image. A "pixel" refers to the smallest segment into which an image can be divided. Received pixels of an input image are associated with a color value defined in terms of a color space, such as color, intensity, lightness, brightness, or some transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB, CMYK, or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. Further, the terms automated or automatically mean that once a process is started (by a machine or a user), one or more machines perform the process without further input from any user.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, it is not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving a contone image having a first amount of bits per pixel into a single-instruction, multiple-data (SIMD) processor;
   converting said contone image to a print-ready format using said SIMD processor, said print ready format having a second amount of bits per pixel that is smaller than said first amount of bits per pixel, and said converting producing a conversion error amount for each pixel converted;
   combining pixels in said print-ready format produced by said converting into a print-ready image; and
   outputting said print-ready image,
   said converting comprising:
      sequentially converting pixels of said contone image along scanlines of said contone image, said scanlines comprising pixels aligned in a processing direction in said contone image;
      diffusing a portion of said conversion error amount from a first pixel in a first scanline to at least one other pixel in said first scanline and to at least one other pixel in a second scanline immediately adjacent said first scanline; and
      simultaneously converting pixels in immediately adjacent scanlines in a spaced manner that separates pixels being simultaneously processed,
   said converting simultaneously using different registers of said SIMD processor to maintain each of: pixel values of said contone image; a threshold value used during said converting; said conversion error amount for each pixel; distributed conversion error amounts produced by said diffusing; and said pixels in said print-ready format, in different registers.

2. The method according to claim 1, said scanlines being parallel to one another.

3. The method according to claim 1, said scanlines comprising adjacent pixels forming a straight line in said processing direction in a two-dimensional array of pixels forming said contone image.

4. The method according to claim 1, said spaced manner separates pixels being simultaneously processed by a processing direction pixel distance,
said processing direction pixel distance permitting said conversion error amount to be supplied to said pixels being simultaneously processed before simultaneous processing begins on said pixels being simultaneously processed, and
said processing direction pixel distance being parallel to said processing direction and comprising an amount of pixels aligned in said processing direction.

5. The method according to claim 1, said diffusing providing different portions of said conversion error amount to different pixels.

6. The method according to claim 1, said conversion error amount being based on a difference from a threshold value.

7. The method according to claim 1, said converting only using one scanline of memory to store said conversion error amount for each pixel while simultaneously processing multiple scanlines.

8. A method comprising:
receiving a contone image having a first amount of bits per pixel into a single-instruction, multiple-data (SIMD) processor;
converting said contone image to a print-ready format using said SIMD processor, said print ready format having a second amount of bits per pixel that is smaller than said first amount of bits per pixel, and said converting producing a conversion error amount for each pixel converted;
combining pixels in said print-ready format produced by said converting into a print-ready image; and
outputting said print-ready image,
said converting comprising:
sequentially converting pixels of said contone image along scanlines of said contone image, said scanlines comprising pixels aligned in a processing direction in said contone image;
diffusing a portion of said conversion error amount from a first pixel in a first scanline to at least one other pixel in said first scanline and to at least one other pixel in a second scanline immediately adjacent said first scanline; and
simultaneously converting pixels in immediately adjacent scanlines in a spaced manner that separates pixels being simultaneously processed by a processing direction pixel distance, said processing direction pixel distance permitting said conversion error amount to be supplied to said pixels being simultaneously processed before simultaneous processing begins on said pixels being simultaneously processed,
said converting simultaneously using:
a first register of said SIMD processor to maintain contone image values having said first amount of bits per pixel for all said pixels being simultaneously processed;
a second register of said SIMD processor to maintain a threshold value used during said converting;
a third register of said SIMD processor to maintain said conversion error amount for all said pixels being simultaneously processed;
a fourth register of said SIMD processor to maintain distributed conversion error amounts produced by said diffusing for all said pixels being simultaneously processed; and
a fifth register of said SIMD processor to maintain said pixels in said print-ready format produced by said converting for all said pixels being simultaneously processed.

9. The method according to claim 8, said scanlines being parallel to one another.

10. The method according to claim 8, said scanlines comprising adjacent pixels forming a straight line in said processing direction in a two-dimensional array of pixels forming said contone image.

11. The method according to claim 8, said processing direction pixel distance being parallel to said processing direction and comprising an amount of pixels aligned in said processing direction.

12. The method according to claim 8, said diffusing providing different portions of said conversion error amount to different pixels.

13. The method according to claim 8, said conversion error amount being based on a difference from a threshold value.

14. The method according to claim 8, said converting only using one scanline of memory to store said conversion error amount for each pixel while simultaneously processing multiple scanlines.

15. A method comprising:
receiving a contone image having eight bits per pixel into a single-instruction, multiple-data (SIMD) processor;
converting said contone image to a print-ready format using said SIMD processor, said print ready format having one bit per pixel, and said converting producing a conversion error amount for each pixel converted;
combining pixels in said print-ready format produced by said converting into a print-ready image; and
outputting said print-ready image,
said converting comprising:
sequentially converting pixels of said contone image along scanlines of said contone image, said scanlines comprising pixels aligned in a processing direction in said contone image;
diffusing a portion of said conversion error amount from a first pixel in a first scanline to another pixel in said first scanline and to four pixels in a second scanline immediately adjacent said first scanline; and
simultaneously converting pixels in immediately adjacent scanlines in a spaced manner that separates pixels being simultaneously processed by a four-pixel distance in said processing direction, said four-pixel distance in said processing direction permitting said conversion error amount to be supplied to said pixels being simultaneously processed before simultaneous processing begins on said pixels being simultaneously processed,
said converting simultaneously using:
a first register of said SIMD processor to maintain contone image values having said eight bits per pixel for all said pixels being simultaneously processed;
a second register of said SIMD processor to maintain a threshold value used during said converting;
a third register of said SIMD processor to maintain one value of said print ready format having one bit per pixel;
a fourth register of said SIMD processor to maintain another value of said print ready format having one bit per pixel;

a fifth register of said SIMD processor to maintain said conversion error amount for all said pixels being simultaneously processed;

sixth through ninth registers of said SIMD processor to maintain distributed conversion error amounts produced by said diffusing for different pixels being simultaneously processed; and a tenth register of said SIMD processor to maintain said pixels in said print-ready format produced by said converting for all said pixels being simultaneously processed.

16. The method according to claim 15, said scanlines being parallel to one another.

17. The method according to claim 15, said scanlines comprising adjacent pixels forming a straight line in said processing direction in a two-dimensional array of pixels forming said contone image.

18. The method according to claim 15, said four-pixel distance in said processing direction being parallel to said processing direction and comprising pixels aligned in said processing direction.

19. The method according to claim 15, said diffusing providing different portions of said conversion error amount to different pixels.

20. The method according to claim 15, said converting only using one scanline of memory to store said conversion error amount for each pixel while simultaneously processing multiple scanlines.

* * * * *